Feb. 21, 1950

H. BUSSIERES

TELEPHONE SYSTEM 2,498,153

Filed March 16, 1948

2 Sheets-Sheet 1

Inventor
Henri Bussieres by [signature]
Atty.

Feb. 21, 1950 H. BUSSIERES 2,498,153

TELEPHONE SYSTEM

Filed March 16, 1948

2 Sheets-Sheet 2

Inventor
Henri Bussieres by J. Lurie[?]
Atty.

Patented Feb. 21, 1950 2,498,153

UNITED STATES PATENT OFFICE 2,498,153

TELEPHONE SYSTEM

Henri Bussierés, Paris, France, assignor to Jean Eppler, Paris, France

Application March 16, 1948, Serial No. 15,212
In France April 29, 1947

6 Claims. (Cl. 179—1)

The invention relates to means for telephone communications.

Telephone systems have already been used that incorporate a loud speaker acting both as an emitter and as a receiver and adapted to be connected separately through the agency of an amplifying system that may form an unit therewith, with a multiplicity of secondary stations including a loud speaker of the same type. Each of the operators may communicate separately with any of the persons provided with one of the secondary stations, the amplifier and loud speaker doing away with the necessity of holding a listening instrument in the vicinity of his ear. However as the loud speaker operates simultaneously as a transmitter and as a receiver, it is necessary for the operator to use a reversing key to pass from one manner of operating to the other.

In order to remove this objectionable operation of a reversing key and to allow a continuous telephone conversation to be held in both directions, telephone networks have already been used wherein each instrument includes a microphone and a loud speaker fed by a supply that feeds the corresponding instrument and is held separate from the casing common to the microphone and loud speaker considered, the various instruments including a common return lead. In this case, and with a view to avoiding the drawbacks of the Larsen effect, it has been generally necessary to separate the microphone from the loud speaker and to house said microphone and loud speaker in separate boxes, the distance between which should be defined in each case as a function of the general conditions prevailing in the room containing the instrument. It has also been found necessary to consider one of the stations of the network as the master station and to provide the other or auxiliary stations with a standard listening instrument that may be used instead of the loud speaker.

An object of the invention is to remove these drawbacks and to obtain as required by the user a loud speaker telephonic transmission, whether separate or simultaneous, between any of the stations of a multiplicity of stations with any other station, and according to the invention a common box contains close to one another a loud speaker and a microphone designed so as to eliminate the Larsen effect, while each loud speaker is provided with an independent line, each microphone being inserted in series with the corresponding source of current, feeding the station considered, that is housed in the box considered and said microphone and supply are inserted in parallel with the loud speaker lines belonging to the other stations, either separately or simultaneously. It should be remarked that the use of independent lines for each loud speaker does away with the electric reactions that appear in circuits with a common return line.

According to a particular embodiment of my invention, the Larsen effect may be removed by giving the diaphragm of the microphone a natural frequency that is comprised between two harmonics or two sub-harmonics of the natural frequency of the loud speaker and differs from the natural frequency of the common box.

In the case where it is desired to use an extent microphone capable of producing the Larsen effect when associated with the loud speaker cooperating therewith, the natural frequency of its diaphragm should be modified, for instance through an alteration of its mass.

According to another embodiment of my invention, the oscillations of the microphone diaphragm are damped so as to approximate aperiodicity.

The arrangement according to my invention includes a small sized box containing side by side a loud speaker and a microphone designed so as to remove the Larsen effect, a source of current mounted in said box, a number of jacks fed by said source of current and the microphone, an output circuit for the loud speaker and a number of circuits connecting each of said jacks with the output circuits of the loud speakers of the other telephone stations of the same network.

With the above and other objects in view that will hereinafter appear, the nature of the invention will be more fully understood by following the detailed description, the appended claims, and the several views illustrated in the accompanying drawings.

Figure 1:
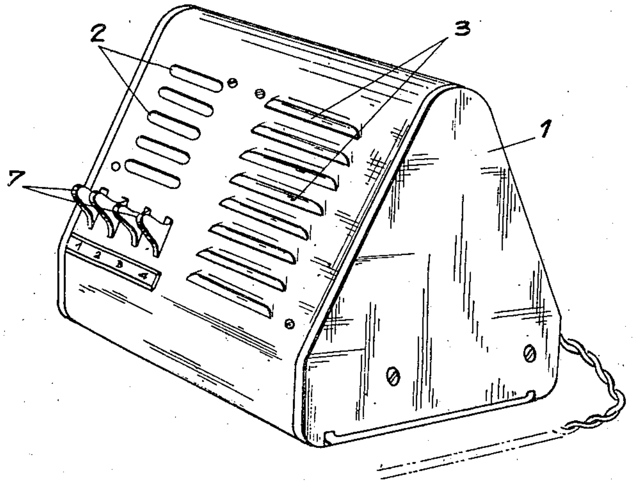
Fig. 1 is a perspective view from the outside of the instrument according to my invention.

The improved telephone transmission apparatus is contained inside a box 1 provided in its front wall with two series of louvres or the like openings as shown at 2 and 3. Inside the box are housed the microphone 4 and a loud speaker 5 located near one another and lying respectively in front of the openings 2 and 3. Said microphone and loud speaker are connected with the front wall of the box 1 by the flange of the sound-directing horn 26 of the microphone and of the loud speaker casing respectively. This connection instead of being a direct one may be executed with the insertion of an insulating material adapted to prevent resonance between the casing and the microphone or the loud speaker, while removing at the same time any possible reaction of the loud speaker on the microphone through the agency of said box. Inside the front wall of the box 1 is mounted furthermore a set of switch-keys 7 the control levers of which pass through said wall outwardly.

Furthermore, the inner capacity of the box 1 may be filled with inert material such as paper, fabric and the like, with a view to lowering its natural frequency.

To one of the other walls of the box are secured through iron fittings 9 two electric batteries 8 of the type used for electric clocks, said batteries being connected in series. Furthermore, a terminal-carrying plate 10 is secured directly to the box 1.

Figure 4:
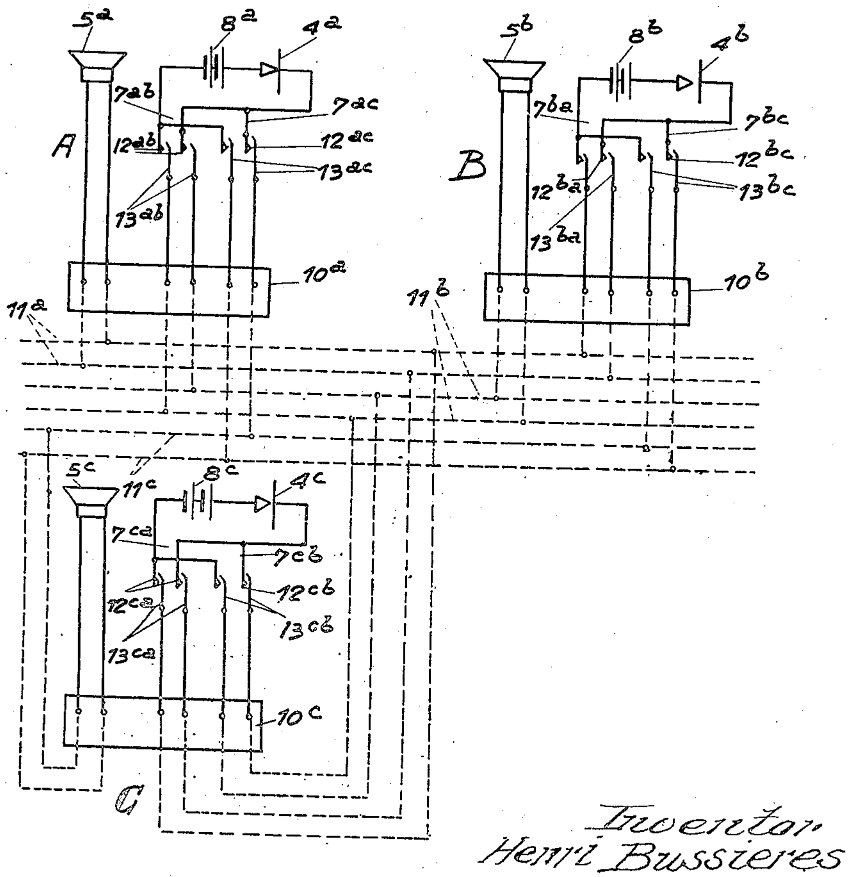
Fig. 4 is the wiring diagram of a communication system with three stations according to the invention.

As illustrated in the wiring diagram of Fig. 4, the different loud speakers 5*a*, 5*b* and 5*c* belonging to the stations A—B—C are provided each with an output lead 11*a*, 11*b*, 11*c*. The microphones 4*a*, 4*b* and 4*c* are connected respectively in series with the sets of batteries 8*a*, 8*b* and 8*c*. Each instrument is provided with two switch-keys 7*ab*, 7*ac*, 7*ba*, 7*bc*, 7*ca*, 7*cb*, the contact pieces of which 12 are connected with the microphone-battery circuit while the corresponding blades 13 are connected in parallel respectively with each of the circuits 11*a*, 11*b* and 11*c*, through the terminal boards 10*a*, 10*b* and 10*c* already connected with the circuits considered 11*a*, 11*b*, 11*c*.

If the operator at the station B depresses the switch-key 7*ba*, for bringing the corresponding blade 13*ba* into contact with the contact piece 12*ba*, said operator when speaking in front of the microphone 4*b*, will be heard by the operator A through the loud speaker 5*a*. To answer the operator at B, the operator at A will depress the jack 7*ab*. If, without releasing the jack 7*ba*, the operator B acts on the jack 7*bc* he may communicate simultaneously with both operators at A and C while he remains capable of listening to the answers of the operator at A. If the operator at C acts also on his switch key 7*cb*, the operator at B will be capable of holding a conversation with the operators both at A and C. Lastly, if the operators A, C act respectively on the switch keys 7*ac* and 7*ca*, a general conversation may take place between the three operators at A, B and C without any of them being constrained to leave his office.

It will be noticed furthermore that a common conversation may be held between the operators at A, B and C without the operators A and C acting on the switch keys 7*ac* and 7*ca*, as each of them may listen to the other through the direct transmission between the loud speaker 5*b* and the microphone 4*b*.

With a view to reducing the bulk of the instrument, and in order to obtain an easier handling, it is of interest to house the microphone and loud speaker as near as possible to one another. However, it is to be feared that the hissing due to the Larsen effect may objectionably interfere with the communication.

Figure 2:
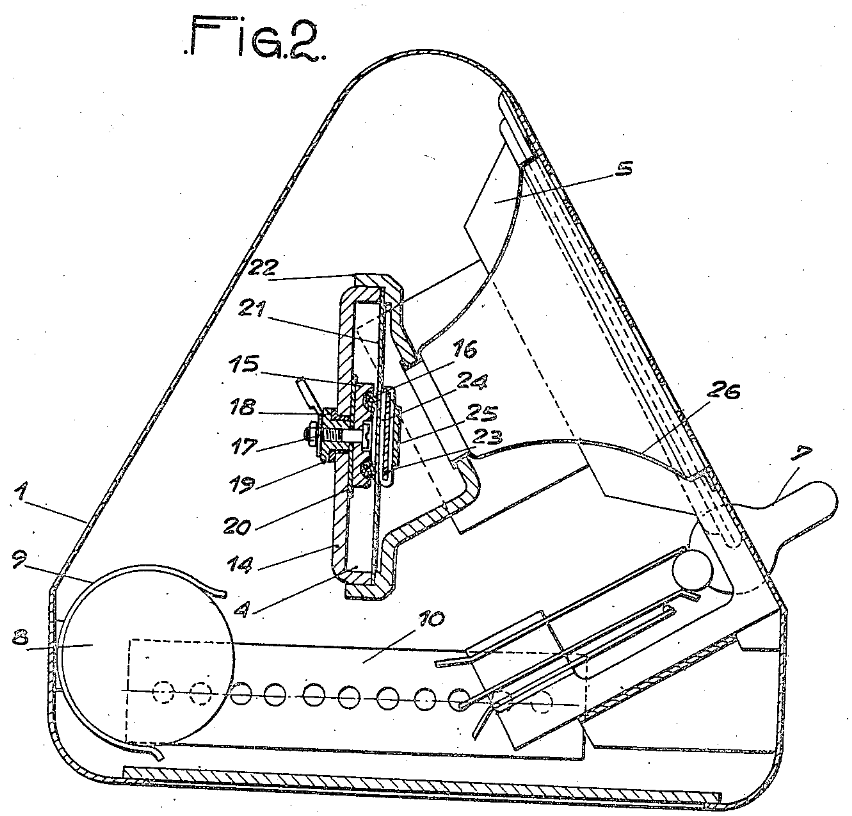
Fig. 2 is a cross section of the same instrument at a larger scale.
Figure 3:
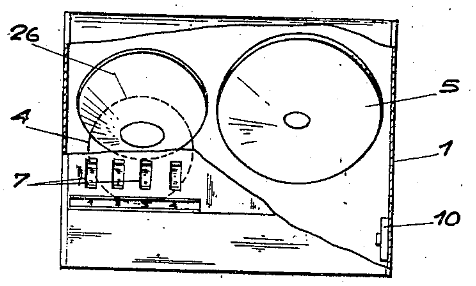
Fig. 3 is a front view of the instrument after removal of the front wall of the box.

To remove this drawback, it is possible to use the form of execution illustrated in Fig. 2.

The microphone 4 is a standard microphone of any type now on the market and includes a casing 14 carrying a carbon case 15 with recesses 16 for housing the grains of carbon. The case 15 is secured to the outer casing 14 through the agency of a screw 17 held fast by a nut 18 against a ring 19 of insulating material, the case 15 being furthermore secured to an insulating washer 20 inserted between said case and the outer casing 14. The screw 17 connected with the positive pole of the source of current provides for the feeding of the case 15.

A thin diaphragm 21 bears against the edges of the casing 14 and is held in position by the cover 22 secured in any suitable manner for instance by screwing on the casing 14. The diaphragm 21 is tensioned through the agency of a screw secured to the casing 14 and connected with the negative pole of the source of current.

According to a particular feature of the invention, a mass 23 secured through welding, gluing or any like suitable manner to the diaphragm 21, with a view to reducing substantially the natural frequency of vibration of said diaphragm which is normally of the magnitude of 800 periods per second.

As illustrated in Fig. 2 and in accordance with a preferred embodiment of the invention, the mass to be secured to the diaphragm 21 is a composite mass including a plate 24 of a material provided with sufficient elasticity and secured directly to the outer surface of the diaphragm 21 and associated with a metal mass 25 secured to said plate 24. When the diaphragm 21 is submitted to vibration, said vibration is transmitted to the mass 25 through the agency of the elastic mass 24, which by reason of its very elasticity has a tendency to damp such vibrations. Consequently, if said vibrations correspond to the natural vibrations of the diaphragm 21, the vibrations of the system 21, 24, 25 are damped with reference to said natural frequency. According to the degree of damping applied, it is possible to eliminate totally the Larsen effect. Preferably said damping is defined so as to provide as far as possible for aperiodicity for the system 21, 24, and 25.

A sound-directing horn 26 may be made rigid with the cover 22 in order to guide the voice of the operator towards the diaphragm 21. Said horn may be shaped as illustrated in Fig. 2 so as to open into proximity with the openings 2.

By way of example, an instrument according to the invention may include a standard microphone having a natural frequency approximating 800 periods per second, a 100 millimeters loud speaker having a natural frequency approximating 1200 periods per second of which the centers are located at about 93 mm. from one another, while the mass 23 is constituted by a ribbon coated with Chatterton's compound 20 mm. broad folded into 5 plies, while the mass 25 is constituted by a weight of about 1 gram.

Obviously, without widening unduly the scope of my invention as defined in accompanying claims, the natural period of the microphone diaphragm may be modified in any manner other than that described. In particular, the material forming said diaphragm and its size may vary with reference to the material or size generally used for its execution.

Similarly, the damping of the vibrations of the microphone diaphragm may be obtained through any means other than an elastic braking, for instance through the agency of a friction operated shock-absorber or a dash pot or generally speaking by any means normally in use for the damping of vibrations.

Having thus described my invention, what I claim as new and desire to secure by Letters Patent is:

1. In a telephone system including a number of individual stations each comprising a casing, a loudspeaker and a microphone including a diaphragm in said casing and secured to the walls of said casing, a source of current, a circuit connecting said source with said microphone, a lead operatively connected with the loudspeaker, leads connecting in parallel the circuit of the source and microphone with the corresponding loudspeaker leads of the other stations and a switch in each of said leads, hand operable means on the outside of the casing for actuating said switch, and means for giving the microphone a natural frequency different from the natural frequency of the casing and comprised between two frequencies in harmonic correspondency with the natural frequency of the loudspeaker.

2. In a telephone system including a number of individual stations each comprising a casing, a loudspeaker and a microphone including a diaphragm in said casing and secured to the walls of said casing, a source of current, a circuit connecting said source with said microphone, a lead operatively connected with the loudspeaker, leads connecting in parallel the circuit of the source and microphone with the corresponding loudspeaker leads of the other stations and a switch in each of said leads, hand operable means on the outside of the casing for actuating said switch, and a weight carried by the diaphragm of the microphone, the mass of said weight being such that it gives the microphone a natural frequency different from the natural frequency of the casing and comprised between two frequencies in harmonic correspondency with the natural frequency of the loudspeaker.

3. In a telephone system including a number of individual stations each comprising a casing, a loudspeaker and a microphone including a diaphragm in said casing and secured to the walls of said casing, a source of current, a circuit connecting said source with said microphone, a lead operatively connected with the loudspeaker, leads connecting in parallel the circuit of the source and microphone with the corresponding loudspeaker leads of the other stations and a switch in each of said leads, hand operable means on the outside of the casing for actuating said switch, and a weight secured to the center of the diaphragm of the microphone, the mass of said weight being such that it gives the microphone a natural frequency different from the natural frequency of the casing and comprised between two frequencies in harmonic correspondency with the natural frequency of the loudspeaker.

4. In a telephone system including a number of individual stations each comprising a casing, a loudspeaker and a microphone including a diaphragm in said casing and secured to the walls of said casing, a source of current, a circuit connecting said source with said microphone, a lead operatively connected with the loudspeaker, leads connecting in parallel the circuit of the source and microphone with the corresponding loudspeaker leads of the other stations and a switch in each of said leads, hand operable means on the outside of the casing for actuating said switch, and a weight elastically connected with the center of the diaphragm of the microphone and carried thereby, the mass of said weight being such that it gives the microphone a natural frequency different from the natural frequency of the casing and comprised between two frequencies in harmonic correspondency with the natural frequency of the loudspeaker.

5. In a telephone system including a number of individual stations each comprising a casing, a loudspeaker and a microphone including a diaphragm in said casing and secured to the walls of said casing, a source of current, a circuit connecting said source with said microphone, a lead operatively connected with the loudspeaker, leads connecting in parallel the circuit of the source and microphone with the corresponding loudspeaker leads of the other stations and a switch in each of said leads, hand operable means on the outside of the casing for actuating said switch, and a weight carried by the diaphragm of the microphone, the mass of said weight being such that it gives the microphone a natural frequency different from the natural frequency of the casing and comprised between two frequencies in harmonic correspondency with the natural frequency of the loudspeaker and an inert sound-dampening material filling the casing.

6. In a telephone system including a number of individual stations each comprising a casing, a loudspeaker and a microphone including a diaphragm in said casing and secured to the walls of said casing, a source of current, a circuit connecting said source with said microphone, a lead operatively connected with the loudspeaker, leads connecting in parallel the circuit of the source and microphone with the corresponding loudspeaker leads of the other stations and a switch in each of said leads, hand operable means on the outside of the casing for actuating said switch, and a weight elastically connected with the center of the diaphragm of the microphone and carried thereby, the mass of said weight being such that it gives the microphone a natural frequency different from the natural frequency of the casing and comprised between two frequencies in harmonic correspondency with the natural frequency of the loudspeaker and an inert sound-damping material filling the casing.

HENRI BUSSIERÉS.

REFERENCES CITED

The following references are of record in the file of this patent:

UNITED STATES PATENTS

| Number | Name | Date |
|---|---|---|
| 893,820 | Thomson | July 21, 1908 |
| 2,157,140 | Molin et al. | May 9, 1939 |
| 2,224,698 | Roseby | Dec. 10, 1940 |